Aug. 23, 1927.

O. PEGLOW 1,640,215

MEASURING TOOL FOR SCREW THREADS

Filed Nov. 20, 1925

Inventor:
Otto Peglow

Patented Aug. 23, 1927.

1,640,215

UNITED STATES PATENT OFFICE.

OTTO PEGLOW, OF BERLIN, GERMANY, ASSIGNOR TO LUDW. LOEWE & CO. ACTIENGE-SELLSCHAFT, OF BERLIN, GERMANY, A CORPORATION OF GERMANY.

MEASURING TOOL FOR SCREW THREADS.

Application filed November 20, 1925, Serial No. 70,225, and in Germany November 29, 1924.

The object of my invention is a measuring tool for testing the "not go" measures of threads.

It is well known that each thread has a double not go measure; one the measure of a freely accessible diameter and the other a measure of a not freely accessible diameter. The freely accessible diameter is the full diameter and the not freely accessible diameter is the diameter such as the pitch diameter and the root diameter.

To test the not go measures of a thread it is necessary to have two gauges. For instance for testing a screw nut one gauge is necessary to test the outer diameter of the thread and another gauge is necessary to test the inner diameter of the thread. Heretofore in combining both gauges in one measuring tool the first gauge was provided at one end of the tool and the other gauge at the other end of the tool.

My invention consists in arranging both gauges for the not go measures of a thread on the same end of the measuring tool. At the end of the tool I provide the gauge for the "not go measure" of the freely accessible diameter. This gauge has a slot permitting the thread to be tested to be brought in engagement with the gauge for the not freely accessible diameter which lies behind the first named gauge.

In the accompanying drawing I have shown three embodiments of my invention.

Figure 4:
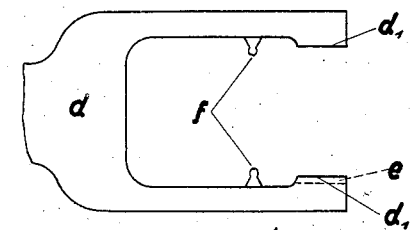

Fig. 4 the side view of an embodiment of my invention for testing the threads of bolts.

Throughout the figures like reference characters designate similar and corresponding parts.

Figure 1:
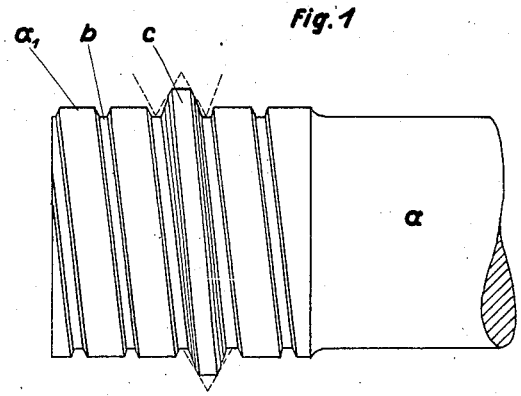
Fig. 1 is a side view of one form of my combined gauge for testing the thread of screw nuts.

The measuring tool represented by Fig. 1 is designated to be used for testing the thread of screw nuts and consists of a body $a$, the head $a_1$ of which has a diameter corresponding to the not go in measure of the inner or freely accessible, or the root, diameter of the nut to be tested. The head $a_1$ is provided with a slot $b$ curved in accordance with the thread of the nut to be tested. Furthermore, the head $a_1$ is provided with a circumferential enlargement $c$ which has the "not go in" measure for the diameter of the flanks of the thread, or the pitch diameter.

Figure 2:
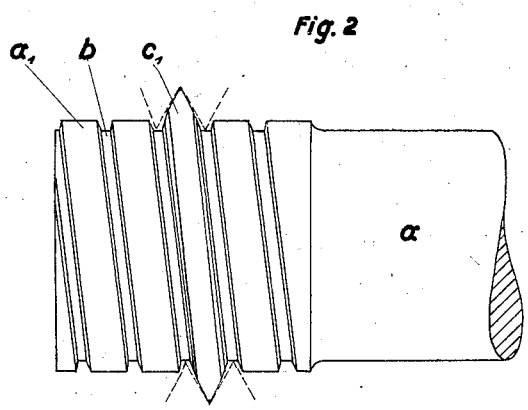
Fig. 2 is a side view of another form of such a gauge.

Fig. 2 is the side view of a tool similar to the tool shown in Fig. 1 except that the enlargement $c$ has the "not go in" measure of the full diameter of the nut thread.

Figure 3:
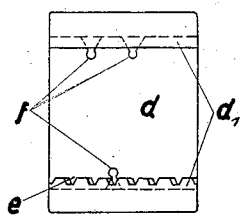
Fig. 3 is the end-view.

For testing the thread of a screw bolt I employ the embodiment of my invention which I have shown in Figs. 3 and 4 of the drawing. In this embodiment the "not go on" gauge for the freely accessible diameter i. e. the full diameter is formed by jaws $d_1$ of the tool body $d$. At least one of the said jaws $d_1$ is provided with slots $e$ to give access to points $f$ forming the "not go on" gauge for the root diameter of the thread.

The application of the measuring tools as shown in Figs. 1 or 2 may be made as follows:

At first the tool is brought in engagement with the nut to be tested without turning. When the inner diameter of the nut thread has the desired dimension the head $a_1$ cannot be introduced into the nut but must just fit into the thread. Now, the tool is turned like a bolt to be introduced into the nut and it will be introduced on account of the slot $b$ until the enlargement $c$ is reached forming the gauge for the "not go in" measure of the flanks of the nut thread.

The procedure is the same with the tool shown in Fig. 2 except that the enlargement $c_1$ is the "not go" gauge for the root diameter of the nut thread.

In employing a measuring tool as shown in Figs. 3 and 4 for testing screw bolts the bolt to be tested is brought straight against the jaws $d_1$ of the tool. When the bolt has the desired diameter it may be turned, and thus introduced between the jaws on account of the slots $e$ of the jaw until it reaches the points $f$. These points $f$ prevent the further introducing of the bolt to be tested when the root diameter of bolt has the desired dimension.

While I have described the preferred embodiments of my invention, it is apparent that changes may be made without departing from the spirit of the invention.

What I claim as my invention and wish to secure by Letters Patent is:

1. In a measuring tool for testing the limiting measures of threads, in combination, a tool body, a gauge for testing the full diameter of a thread, a gauge for testing a diameter less than the full diameter of the thread, both said gauges being arranged at the same end of the tool body.

2. In a measuring tool for testing the limiting measures of threads, in combination, a tool body, a gauge for testing the full diameter of a thread, a gauge for testing a diameter less than the full diameter of the thread, both said gauges being arranged at the same end of the tool body, said first gauge having a slot permitting a threaded piece to be presented to the second gauge.

3. In a measuring tool for testing the limiting measures of threads, in combination, a tool body, a head on said body forming a gauge for testing the full diameter of a thread, and a gauge for testing the root diameter of the thread and positioned behind said head, said head having a slot for permitting a threaded piece to be presented to said root diameter gauge.

4. In a measuring tool for testing the limiting measures of threads in combination, a tool body, a cylindrical head on said body forming a gauge for testing the full diameter of a thread, an enlargement of said cylindrical head forming a gauge for testing a diameter less than the full diameter, said cylindrical head having a curved slot for allowing a threaded piece to be presented to said smaller diameter gauge.

5. In a measuring tool for testing the limiting measures of threads, in combination, a gauge body having a gauge at one end for testing one diameter of a thread, a second gauge on the same end spaced away from the first gauge for testing a different diameter of the thread, the gauge body having a slot therein to permit turning of the threaded body past the first gauge into engagement with the second gauge.

In testimony whereof I have affixed my signature.

OTTO PEGLOW.